United States Patent [19]
Mizuta

[11] Patent Number: 5,300,765
[45] Date of Patent: Apr. 5, 1994

[54] MEMORY CARD WITH LATCH-UP PROTECTION

[75] Inventor: Masaharu Mizuta, Itami, Japan

[73] Assignee: Mitsubishi Denki Kabushiki Kaisha, Tokyo, Japan

[21] Appl. No.: 841,288

[22] Filed: Feb. 28, 1992

Related U.S. Application Data

[63] Continuation of Ser. No. 495,126, Mar. 19, 1990, abandoned.

[51] Int. Cl.⁵ .................. H02H 3/08; G06K 19/07
[52] U.S. Cl. ............................ 235/492; 235/487; 361/101; 365/226
[58] Field of Search .............. 235/487, 492, 380; 365/226-229; 361/100, 101

[56] References Cited

U.S. PATENT DOCUMENTS

| | | | |
|---|---|---|---|
| 3,311,787 | 3/1967 | Gunderman | 361/101 |
| 4,353,105 | 10/1982 | Black | 361/100 X |
| 4,587,640 | 5/1986 | Saitoh | 365/229 |
| 4,611,302 | 9/1986 | Bockett-Pugh | 365/229 |
| 4,713,719 | 12/1987 | Kugelman | 361/100 X |
| 4,772,783 | 9/1988 | Ono et al. | 235/492 |
| 4,912,346 | 3/1990 | Mizuta | 365/228 X |
| 4,916,662 | 4/1990 | Mizuta | 365/52 |
| 4,922,367 | 5/1990 | Hidaka | 361/58 |
| 4,962,485 | 10/1990 | Kato et al. | 365/229 |
| 5,025,344 | 6/1991 | Maly et al. | 361/101 X |
| 5,144,585 | 9/1992 | Min et al. | 365/226 |

OTHER PUBLICATIONS

"IC Memory Card Guideline"; Japan Electrical Industry Development Association; 1986.

*Primary Examiner*—Vincent P. McGraw
*Attorney, Agent, or Firm*—Leydig, Voit & Mayer

[57] ABSTRACT

A memory card with a memory element utilizing a CMOS type electric field effect transistor comprises an overcurrent detecting device for detecting the size of current flowing through a power source circuit in order to immediately stop an overcurrent through the power source circuit when a latch-up phenomenon occurs in the memory element and a switch to open the power source circuit when the overcurrent is detected.

2 Claims, 2 Drawing Sheets

MEMORY CARD WITH LATCH-UP PROTECTION

This application is a continuation of application Ser. No. 07/495,126, filed Mar. 19, 1990 now abandoned.

BACKGROUND OF THE INVENTION

1. FIELD OF THE INVENTION

This invention relates to a memory card with a built-in semiconductor memory element.

1. DESCRIPTION OF THE RELATED ART

Memory cards incorporating RAM (Random Access Memory), ROM (Read Only Memory), etc. are generally designed with the principal aim of providing low electric power consumption for various applications of portable equipment. RAMs as well as ROMs therefore basically use a CMOS logic type element. The CMOS element's electric power consumption is very low as compared with other NMOS elements. It is therefore essential to utilize the CMOS element for a RAM memory card particularly requiring a battery backup in order to provide the RAM memory card with a long service life having a minimal battery consumption during the backup.

The CMOS element is liable to incur a latch-up phenomenon from the viewpoint of its logical structure. The latch-up phenomenon involves a continuous overcurrent flow substantially the same as a short circuit current between the power source of the CMOS element and ground, which is due to various causes. This phenomenon leads ultimately to permanent thermal destruction. When this happens, the removal of the cause of the phenomenon and temporarily stopping the power to the CMOS element causes the latch-up phenomenon to disappear, whereby the CMOS or memory may be reused.

The latch-up phenomenon is likely to occur when the card is inserted or taken out. When the card is inserted, and the connectors of the card and of a host where the card is used are connected, an unexpected order in connection, i.e., first, a power source line is connected, then a ground line, and then an input and output signal line may take place, and a difference in voltage may also occur. That is, the electric potential of the input or the output signal line increases more than that of the power source line owing to the fact that the input and output signal line is connected earlier than the power source line. The foregoing is one of the causes for the latch-up phenomenon. Inversely, if the power source line is disconnected much earlier than the input and output signal line, the electric potential of the input and output line increases more than that of the power source. Short circuiting between the power source of the CMOS element and ground caused by the above conditions may result in damage to the element. When the damage is not severe, only the memory is destructed, but in case of serious damage, the memory emits smoke and burns out, ultimately leading to the burning of the equipment.

The conventional memory card provides no measures to protect against thermal destruction caused by the the above mentioned latch-up phenomenon, i.e., an overcurrent between the power source of the memory element, RAM or ROM, and ground. As stated above, since the latch-up phenomenon involves a continuous overcurrent flow substantially the same as a short circuit between the power source and ground, the greater the capacity of power fed to the memory card from the host, the greater the thermal destruction becomes, resulting in burning of the equipment.

SUMMARY OF THE INVENTION

In view of the foregoing disadvantages, it is an object of this invention to provide a highly reliable memory card including a CMOS element which prevents a memory card from being destroyed by the latch-up phenomenon involving a continuous overcurrent flow.

In light of the foregoing object, the present invention discloses a memory card with a built-in semiconductor memory element which immediately stops an overcurrent flowing through a power source connecting circuit when a latch-up phenomenon occurs, the memory card comprising: memory means including one or more memory elements where a CMOS type electric field effect transistor is used; power source means including an external power source arranged in an external device or a combination of the external power source and an internal power source incorporated in the card; power source connecting circuits to connect the power source means to the memory means; input and output means for inputting and outputting data signals between the memory means and the external device; switch means for opening and closing the power source connecting circuits in order to connect and disconnect the memory means and the power source means; and overcurrent detecting means for detecting current from the power source flowing through the power source connecting circuits in order to control the opening and closing of the switch means when detecting an overcurrent, and opening power source connecting circuits.

In the memory card according to the present invention, the power source current is immediately stopped upon detecting an overcurrent, and then the power being fed to the CMOS memory element in the latch-up state is stopped, whereby the thermal destruction thereof is prevented.

Other features and advantages of the present invention will become apparent upon reference to the following Description of the Preferred Embodiments when read in light of the attached drawings.

DESCRIPTION OF THE PREFERRED EMBODIMENTS

Figure 1:
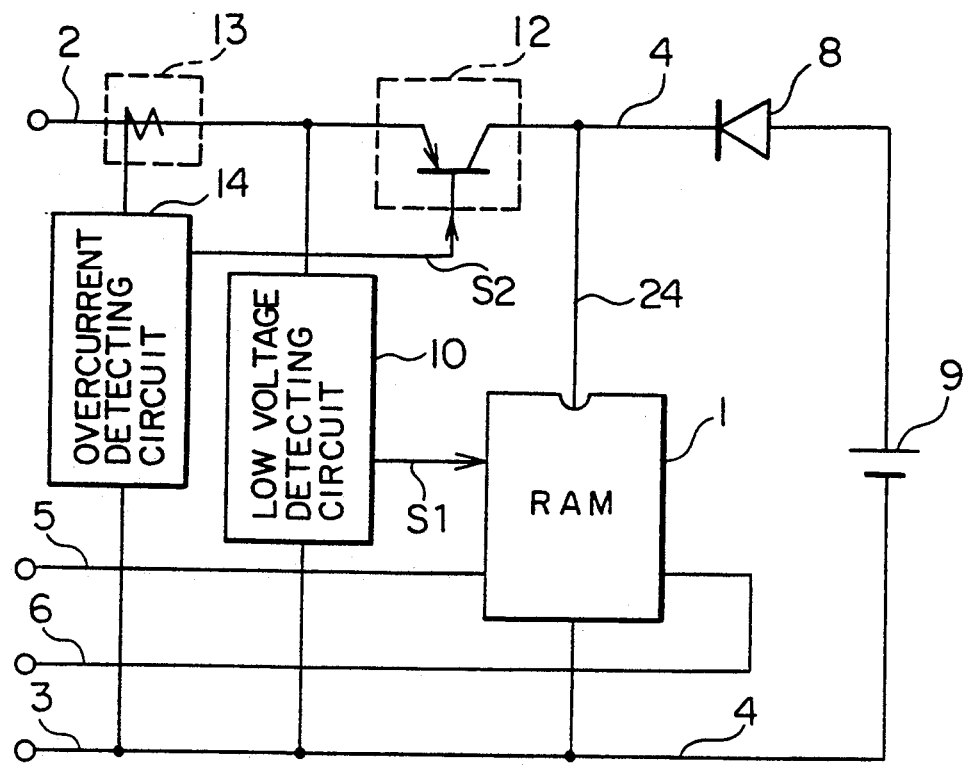
FIG. 1 is a circuit diagram of a RAM card according to an embodiment of this invention.

FIG. 1 is a circuit diagram roughly showing the internal configuration of the RAM card according to an embodiment of this invention. The RAM 1, a memory element, is connected via an external power source line 2 and a ground line 3 to an external power source on a reader/writer side (not shown) for feeding power when a RAM card is connected to the reader/writer (not shown) on a host side. Further, power is fed to the memory element from a built-in battery 9 for backup of the card connected via an internal power feed line 4, when the RAM card is not connected to the reader/writer. A common power source line 24 extends from a node of the external power source line 2 and the internal power feed line 4 and is connected to the RAM 1. Signal delivery to the outside is performed on input and output signal lines 5 and 6. A diode 8 connected to the internal power feed line 4 is used for switching power feed from the external power source and the internal power source 9. A low voltage detecting circuit 10 transmits a standby signal S1 to the RAM 1 upon detecting that the power source voltage has fallen to about 4.5V or less, causing the RAM 1 to enter a standby state. A current detector 13 comprising, for example a resistor, detects the current value of the external power source line 2. An overcurrent detecting circuit 14 including a comparator (not shown) supplies a transistor switch 12 with an open circuit signal S2 when the current detected by the current detector 13 exceeds a predetermined value, that is, when an overcurrent occurs in the external power source line 2. The current detector 13 and the overcurrent detecting circuit 14 comprise an overcurrent detecting means. The transistor switch 12 is provided as an electronic switch for opening and closing in accordance with an electronically controlled signal S2. It is located between the external power source (not shown), to which the power source line 2 is and the RAM 1 are connected, and it performs opening and closing operations in accordance with the open circuit signal S2.

The operation of the present invention will now be described. In the event that an abnormally increased overcurrent occurs in the power source line 2 due to the latch-up phenomenon, the current detector 13 and the overcurrent detecting circuit 14 detect the overcurrent. The overcurrent detecting circuit 14 transmits the open circuit signal S2 to the transistor switch 12, whereby the transistor switch 12 opens a current passageway before the RAM 1 is thermally destroyed. Not only the RAM 1 but also the RAM card is thus prevented from being destroyed.

Figure 2:
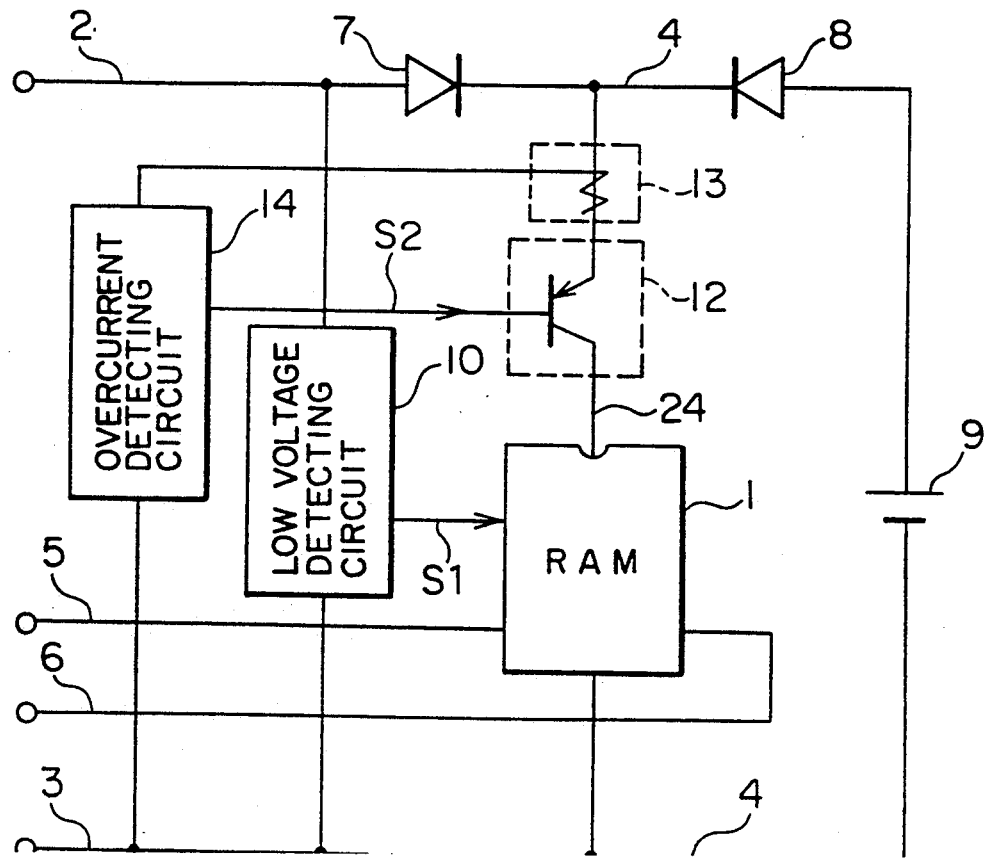
FIG. 2 is a circuit diagram illustrating the RAM card according to another embodiment of this invention.

FIG. 2 is a circuit diagram of the RAM card according to another embodiment of this invention. In the embodiment of FIG. 1, the overcurrent in the external power source line is detected and the power feed from the external power source is stopped, whereas in FIG. 2, the current detector 13 and the transistor switch 12 are provided in the common power source line 24 extending from the node of the power source line 2 and the internal power feed line 4 to the RAM 1 in order to detect an overcurrent to the RAM 1, thereby stopping all power feed to the RAM 1. The operations of the transistor switch 12, the current detector 13 and the overcurrent detecting circuit 14 are the same as described in FIG. 1.

Figure 3:
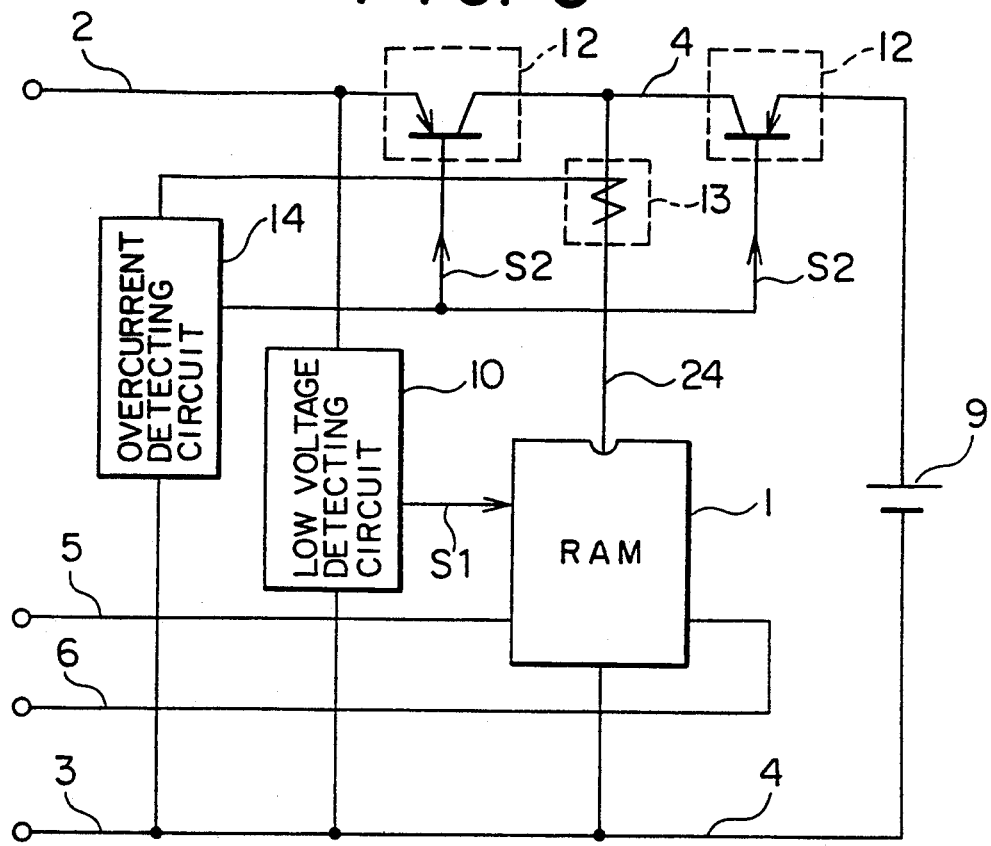
FIG. 3 is a circuit diagram depicting further the RAM card according to another embodiment of this invention.

FIG. 3 is a circuit diagram of the RAM card according to another embodiment of this invention. Referring to the FIG. 3, the current detector 13 is provided on the common power source line 24 and a transistor switch 12 is provided on both the power source line 2 and the internal power feed line 4, respectively. With this configuration, an overcurrent to the RAM 1 is detected and the power feed from both the external power source and the internal power source 9 is respectively stopped in the event of the occurrence of an overcurrent.

Figure 4:
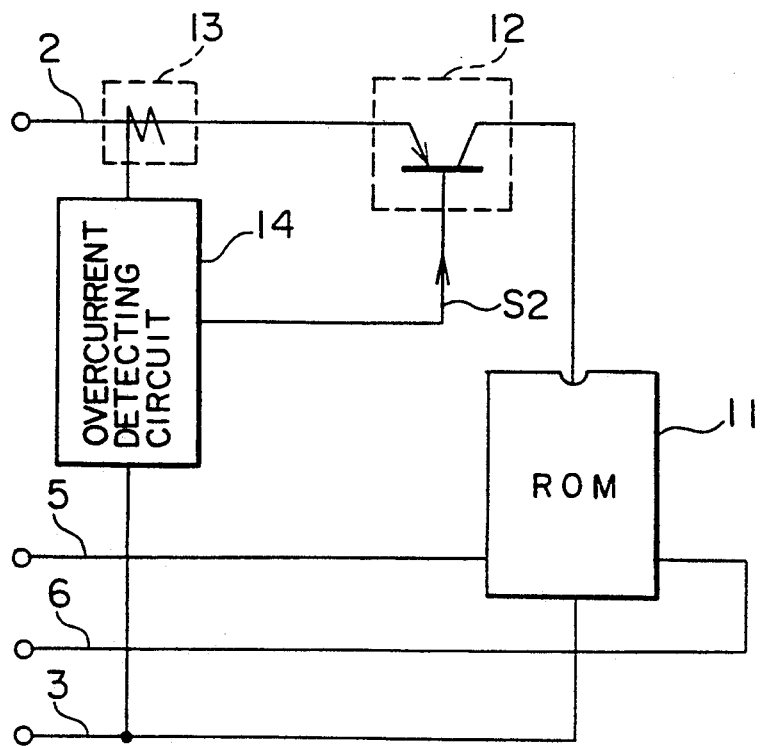
FIG. 4 is a circuit diagram showing a ROM card according to this invention.

FIG. 4 shows a circuit diagram where the overcurrent described in FIG. 3 occurs during the use of the ROM card. In the ROM card circuit of FIG. 4, although an internal power source circuit (including the built-in battery 9, the internal power feed line 4 for the backup power and the diode 8) as well as the low voltage detecting circuit 10 are not provided, the relationship among the external power source line 2, the ground line 3 and the input and output signal lines 5 and 6 is the same as in the case of the RAM card. The current detector 13 and the transistor switch 12 are provided on the external power source line 2. When the overcurrent detecting circuit 14 detects that the current value detected by the detector 13 exceeds a predetermined value, the overcurrent detecting circuit 14 transmits the open circuit signal S2 to the transistor switch 12, causing the transistor switch 12 to open the circuit.

As described above, in the memory card according to this invention, even if an abnormal overcurrent attempts to flow from the power source because the built-in memory element incurs the latch-up phenomenon and the like, the power feed to the built-in memory element is immediately stopped upon detecting the overcurrent and a highly reliable memory card can thus be obtained.

The invention has been described in detail with particular reference to preferred embodiments thereof, but it will be understood that variations and modifications can be effected within the spirit and scope of the invention.

What is claimed is:

1. A memory card with a built-in semiconductor memory element which immediately stops an overcurrent when a latch-up phenomenon occurs, said memory card comprising:

memory means including one or more writable RAMs having CMOS type electric field effect transistors;

power source means including an external power source arranged in an external device and an internal power source connected across said memory means;

means for connecting said power source means to said memory means including a power source line connecting the one or more RAMs to the external power source, a ground line, an internal power feed line connecting the one or more RAMs to the internal power source, a common power source line which is connected to the power source line and the internal power feed line at a node and diodes for switching between said internal and external power sources;

input and output means for inputting and outputting data signals between said memory means and said external device;

switch means for connecting and disconnecting said memory means and said power source means, said switch means including two transistor switches connected respectively to the power source line and the internal feed line;

a low voltage detecting circuit connected to the one or more writable RAMs said low voltage detecting circuit transmitting a standby signal to cause the one or more RAMs to enter into a standby state when the voltage of the external power source falls below a predetermined voltage; and overcurrent detecting means for detecting the current from said power source flowing through said means for connecting and for opening said switch means when the current exceeds a predetermined value, said overcurrent detecting means including a current detector connected in series with the common power source line and an overcurrent detecting circuit for transmitting an open circuit signal to open the transistor switches when the current detector detects an overcurrent.

2. A memory card comprising:
a memory element;
an internal power source connected to said memory element;
a common power source line connected to said memory element;
a power source line connected to said common power source line at a first node for delivering current to said memory element;
an internal power feed line interconnecting said internal power source and the first node and said internal power source and said memory element;
a current detector connected to said common power source line for detecting the current flowing in said common power source line;
an overcurrent detecting circuit connected to said current detector which generates a signal when the current flowing in said common power source line exceeds a predetermined value;
a first switching element connected to said overcurrent detecting circuit at a first connection point and connected in a in-line manner with said power source line, said first switching element opening responsive to the signal generated by said overcurrent detecting means; and
a second switching element connected to said overcurrent detecting circuit, said internal power source and the first node, said second switching element opening responsive to the signal generated by said overcurrent detecting means;
whereby said first and second switching elements prevent current from flowing to the memory element when a latch-up phenomenon occurs.

* * * * *